(12) United States Patent
Brewster et al.

(10) Patent No.: US 7,032,924 B2
(45) Date of Patent: Apr. 25, 2006

(54) ELECTRICALLY CONTROLLED AIRBAG INFLATOR APPARATUS AND METHOD

(75) Inventors: B. Scott Brewster, deceased, late of Provo, UT (US); by Elaine C. Brewster, legal representative, Provo, UT (US); David J. Green, Brigham City, UT (US); Brian A. Laubacher, Pleasant View, UT (US); Guy Letendre, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 85 days.

(21) Appl. No.: 10/602,445

(22) Filed: Jun. 24, 2003

(65) Prior Publication Data

US 2004/0262901 A1 Dec. 30, 2004

(51) Int. Cl.
*B60R 21/26* (2006.01)
(52) U.S. Cl. ............... 280/736; 280/737; 280/740; 280/741
(58) Field of Classification Search ........... 280/736, 280/737, 740, 741, 742; 102/530
See application file for complete search history.

(56) References Cited

U.S. PATENT DOCUMENTS

| | | | |
|---|---|---|---|
| 3,695,179 A | 10/1972 | Rainone et al. | |
| 3,724,870 A | 4/1973 | Kurokawa et al. | |
| 3,791,302 A | 2/1974 | McLeod | |
| 4,967,637 A * | 11/1990 | Loffler et al. | 89/1.816 |
| 5,069,478 A | 12/1991 | Kim | |
| 5,098,123 A | 3/1992 | Jones | |
| 5,100,170 A * | 3/1992 | Mihm et al. | 280/735 |
| 5,230,532 A | 7/1993 | Blumenthal et al. | |
| 5,470,104 A | 11/1995 | Smith et al. | |
| 5,566,853 A * | 10/1996 | Schenker et al. | 220/581 |
| 5,655,790 A | 8/1997 | Faigle et al. | |
| 5,678,855 A | 10/1997 | Byon | |
| 5,683,107 A | 11/1997 | Headley et al. | |
| 5,851,027 A | 12/1998 | DiGiacomo et al. | |
| 5,857,698 A | 1/1999 | Fuerst et al. | |
| 5,876,062 A | 3/1999 | Hock | |
| 6,039,348 A | 3/2000 | Niederman et al. | |
| 6,196,582 B1 | 3/2001 | Sparkman et al. | |
| 6,913,285 B1 * | 7/2005 | Rink et al. | 280/736 |

\* cited by examiner

*Primary Examiner*—Paul N. Dickson
*Assistant Examiner*—Toan C. To
(74) *Attorney, Agent, or Firm*—Sally J Brown

(57) ABSTRACT

The present invention relates to an inflator for inflating a cushion of an airbag module. The inflator induces expansion of a gas by application of an electric voltage to the gas or to a plurality of filaments disposed within the gas. The voltage may be applied between a nozzle and a conductor in such a manner that an arc forms within the nozzle. Gas passing through the nozzle then forms an arc-jet that further heats adjacent gas. Multiple gases may be used, including gases designed to combust and/or dissociate to produce additional moles of inflation gas. The voltage may alternatively be applied within the housing in such a manner that a corona is formed in the gas, thereby at least partially ionizing the gas to heat the gas. As yet another alternative, the voltage may be applied to some of the filaments to provide gas expansion via filament combustion.

26 Claims, 6 Drawing Sheets

ELECTRICALLY CONTROLLED AIRBAG INFLATOR APPARATUS AND METHOD

BACKGROUND OF THE INVENTION

1. Field of the Invention

The present invention relates to systems and methods for protecting vehicle occupants from injury. More specifically, the present invention relates to inflators designed to provide variable quantities of inflation gas at varying temperatures through variation of an activation signal used to trigger deployment of the inflator.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield.

Side impact airbags such as inflatable curtains and seat mounted airbags have also been developed in response to the need for protection from impacts in a lateral direction, or against the side of the vehicle. Other airbags such as knee bolsters and overhead airbags also operate to protect various parts of the body from collision.

Known inflators generally fall into three categories: pyrotechnic inflators, compressed gas inflators, and hybrid inflators. Pyrotechnic inflators depend solely on combustion to provide inflation gas, while compressed gas inflators may use only a minimal amount of pyrotechnic that opens a chamber to release the inflation gas from a compressed state. Hybrid inflators use a combination of combustion and compressed gas storage to provide the inflation gas to fill the cushion.

Of all of the types described above, most inflators have the capacity to produce only a certain, pre-established quantity of inflation gas. The quantity and rate of gas production determine how hard the cushion will be upon inflation. Softer cushions are beneficial in low velocity collisions, in which the cushion need not be extremely stiff to prevent the occupant from contacting the vehicle interior. However, for high speed collisions, a stiffer cushion is needed to more rapidly absorb the occupant's momentum. Other factors such as the occupant's weight and position influence the optimal stiffness of the cushion.

Since all of the above factors can be expected to vary for any single collision situation, it would be desirable to create an inflator capable of providing varying quantities of inflation gas at varying temperatures in response to changes in vehicle velocity, occupant weight, occupant position, and the like. The desirability of such a system is reflected in the United States government's new frontal safety requirements, as set forth in the FMVSS 208 Ruling.

In response to this need, variable output, or "adaptive" inflators have been created. Adaptive inflators often have multiple chambers, each of which has an initiator. The initiators are independently controllable so that fewer chambers are opened for a low speed collision, while more chambers are opened to provide more inflation gas under high speed impact conditions. Unfortunately, many such designs are quite expensive. The use of multiple chambers, initiators, and the like adds significantly to the cost of the parts and assembly of the inflator. In general, the need for pyrotechnic initiators, ignition materials, gas generants, and the like adds significantly to the cost of known inflators.

Furthermore, known adaptive inflators are typically able to produce gas only at a limited number of discrete quantities. For example, an adaptive inflator may only be capable of producing a small quantity of inflation gas for a low speed collision or a large quantity of inflation gas for a high speed collision. If a medium speed collision occurs, the inflator may have to revert to the setting for high speed impact, thereby providing a cushion that is harder than necessary, and thus more likely to cause minor injury.

Accordingly, a need exists for an airbag inflation apparatus and method that are capable of producing a comparatively finely tunable quantity of inflation gas at varying temperatures. A need further exists for such an apparatus and method that can be utilized with a minimum number of parts that require a comparatively small amount of time and resources to assemble to reduce the overall cost of the airbag module. Furthermore, a need exists for such an apparatus and method that is adaptable to suit multiple cushion types and inflation gas distribution schemes.

SUMMARY OF THE INVENTION

The apparatus and method of the present invention have been developed in response to the present state of the art, and in particular, in response to the problems and needs in the art that have not yet been fully solved by currently available airbag inflators. Thus, it is an overall purpose of the present invention to provide an airbag inflation apparatus and method that provides a comparatively finely tunable quantity of inflation gas at varying temperatures, limits the cost of the airbag module, and permits adaptation for multiple cushion types and inflation gas distribution schemes.

According to one embodiment, the inflator of the invention is incorporated into an airbag module. The airbag module may optionally be an inflatable curtain module, or IC module, with an inflatable cushion configured to activate to shield a vehicle occupant from impact against a lateral surface of the vehicle, such as a door or window. The cushion preferably has at least one protection zone, and may optionally have multiple protection zones, each of which may serve to protect one occupant. Thus, a single cushion may, for example, cover a rear door or surface as well as a front door, so that an occupant of a back seat can be protected as well as an occupant of a front seat. The protection zones may be connected by a central tether configured to convey tension and inflation gas between the protection zones.

The IC module also has an inflator disposed partially within the cushion such that inflation gas is able to flow from the inflator directly into the cushion. The inflator is controlled by an electronic control unit (ECU) coupled to an accelerometer that reads the acceleration of the vehicle and transmits an activation signal to trigger deployment of the inflator when a collision is detected.

The inflator has a housing with an outlet end and a containment end. The housing contains an interior wall, a part of which is shaped to form a nozzle. A conductor, in the form of a rod, passes through the housing. The outlet end of the housing has a diffuser with a plurality of outlet orifices. Outlet ports provide fluid communication between the diffuser and the remainder of the housing during deployment. Prior to deployment, the outlet ports are covered and sealed by an annular foil.

The interior wall is disposed adjacent to the outlet end, with the nozzle oriented toward the containment end. The nozzle has a constricted passageway through which gas is able to flow at a limited mass flow rate. The interior wall defines an interior chamber within the inflator and an exterior chamber between the housing and the interior wall. A first gas is disposed within the interior chamber and a second gas is disposed within the exterior chamber. The constricted passageway of the nozzle is sealed via an interior burst disc to keep the first and second gases separate from each other.

The rod extends into the housing and into the interior chamber in such a manner that a first end of the rod is adjacent to a conical interior surface of the nozzle. The rod is kept electrically separate from the interior chamber and the housing by insulative seals. A second end of the rod extends outside the housing so that the ECU can be coupled to the second end of the rod and to the housing to act as a voltage source. The housing and the interior wall are in electrical communication with each other so that current passes in the form of an arc between the nozzle and the first end of the rod in response to the voltage.

When the ECU detects a collision, the ECU provides the voltage between the housing and the rod, thereby forming the arc within the interior chamber. The first gas may comprise a comparatively lean fuel/oxidizer mixture. Hence, the arc may initiate localized combustion of the first gas, which increases the pressure within the interior chamber, thereby rupturing or removing the interior burst disc. Since the pressure within the interior chamber is higher than that of the exterior chamber, the first gas flows from the interior chamber through the constricted passageway of the nozzle. The first gas is ignited upon passage through the arc to form an arc-jet projecting into the exterior chamber.

The second gas need not have a fuel or oxidizer. The second gas may simply expand due to the addition of heat, or may dissociate to provide additional moles of gas. In either case, the second gas expands in response to the presence of the arc-jet and bursts the annular foil covering the outlet ports. The second gas flows past the arc-jet as it moves toward the outlet ports so that additional thermal energy is added to the gas prior to expulsion into the cushion. The arc may be maintained substantially throughout the deployment of the inflator. Alternatively, the voltage may be discontinued at any time to limit expansion of the first and second gases, thereby limiting the output of the inflator for a less severe collision. The magnitude of the voltage may also be adjusted to tune the inflator output.

The inflator may be easily manufactured by, first, forming the housing and the interior wall separately from each other. The annular foil is positioned to cover the outlet ports of the housing. The rod is then fixed in place with respect to the interior wall by inserting an insulative seal into the open end of the interior wall and inserting the rod into the insulative seal, until the first end of the rod is disposed at the desired displacement from the conical interior surface of the nozzle. The first gas may then be added to the interior chamber and the interior chamber may be sealed via the interior burst disc.

The interior wall may then be inserted into an opening in the outlet end of the housing and attached to the housing. The diffuser is then fastened to the remainder of the housing, with the rod extending through another insulative seal in the diffuser. The second gas is added to the exterior chamber and the exterior chamber is sealed. The inflator is then coupled to the ECU by, for example, coupling the electric lines from the ECU to the housing of the inflator and to the rod. The inflator is then positioned with respect to the cushion so that the inflator is able to expel inflation gas into the cushion in the even of a collision.

According to one alternative embodiment, the housing again has an outlet end and a containment end. An interior wall is disposed at the containment end. The nozzle is formed in the interior wall such that a first chamber exists within the interior wall, and an exterior chamber exists between the interior wall and the housing. The interior chamber contains a first gas and the exterior chamber contains a second gas. The first and second gases are again separated by an interior burst disc.

A supplemental wall is attached to the containment end of the housing. The supplemental wall defines a supplemental chamber in communication with the interior chamber. Thus, the first gas is also disposed in the supplemental chamber. The rod extends through the supplemental wall and the open end of the interior wall via insulative seals.

The outlet end of the housing has a diffuser with a plurality of outlet orifices. An outlet port is disposed between the diffuser and the remainder of the housing, and may be sealed during normal operation by a burst disc.

Operation of the inflator is then similar to that of the previous embodiment. The ECU creates a voltage that produces an arc between the nozzle and the first end of the rod. The arc heats the first gas to open the nozzle and create an arc-jet. The arc-jet heats the second gas and ruptures or removes the burst disc, thereby permitting the first and second gases to escape the inflator through the diffuser. Since the nozzle and the outlet port are at opposite ends of the housing, a substantial portion of the second gas may exit the inflator without flowing past the arc-jet.

The inflator according to this embodiment may be manufactured with the housing and the interior wall integral with each other. The rod may be installed in the interior wall, and the supplemental wall may be attached to the inflator in such a manner that the rod extends through the supplemental wall. The supplemental chamber may contain the first gas in cryogenic form; after installation of the supplemental wall, the cryogenic material may sublimate to fill the interior chamber with the fist gas. After the interior chamber is sealed via the interior burst disc, the second gas may be added to the exterior chamber and the exterior chamber may be sealed.

According to another alternative embodiment, an inflator according to the invention has a housing with an outlet end and a containment end. An interior wall is disposed within the housing to form an interior chamber between the outlet and containment ends. The interior wall has a nozzle formed therein. The interior chamber is divided into a nozzle portion and a distal portion by an interior chamber divider. The distal and nozzle portions communicate with each other via orifices in the interior chamber divider.

An exterior chamber is defined by the housing and the interior wall. The exterior chamber is separated into an outlet portion and a distal portion by an exterior chamber divider. Orifices in the exterior chamber divider provide fluid communication between the distal and outlet portions. A rod extends into the housing, through the interior wall, and through the interior chamber divider to reach the nozzle. Insulative seals are used to prevent electrical communication between the rod and the housing, the interior wall, and the interior chamber divider.

Like the previous embodiment, the outlet end of the housing has a diffuser in which outlet orifices are disposed. An outlet port is disposed to permit gases to flow from the remainder of the housing into the diffuser.

As with the previous embodiments, the ECU provides a voltage between the nozzle and the rod to produce an arc. The arc heats the first gas to open the interior chamber and form an arc-jet. Due to the position of the interior chamber within the housing, the arc-jet is disposed adjacent to the outlet port. Thus, inflation gas flowing through the outlet port will generally be heated by the arc-jet.

The housing, the interior wall, the interior chamber divider, and the exterior chamber divider may be integrally formed through molding operations, punching operations, or the like. The rod is positioned and the insulative seals are successively installed in such a manner that the rod is retained with the first end of the rod adjacent to the nozzle. The first gas is added to the interior chamber and the first and second chambers are sealed from each other by an interior burst disc or the like. The second gas is added to the exterior chamber and the exterior chamber is also sealed.

According to another alternative embodiment of the invention, an inflator has a housing with an outlet end and a containment end. The housing may have a generally tubular shape with the outlet end positioned on one rounded side so that the inflator is adapted for use with alternative airbag types, such as passenger side frontal impact airbags or the like. A diffuser with outlet orifices is disposed at the outlet end. An outlet port, sealed with a burst disc, is disposed between the diffuser and the remainder of the housing. The housing also has a first end and a second end at opposing ends of the tubular shape.

The housing forms a chamber filled with a gas. A conductor in the form of a rod extends through the housing, from the first end to the second end. The rod passes through the first end via an insulative seal that prevents electrical communication between the rod and the housing. The rod is seated in an insulative retainer in the second end of the housing.

Upon detection of a collision, the ECU produces a voltage between the housing and the rod. The voltage may be time varied at a frequency and amplitude designed to create a corona within the gas. The gas is at least partially ionized by the corona and heated as a consequence of the ionization process. Thus, the gas expands as a result of the added thermal energy. The gas may also dissociate and/or combust in response to the addition of heat to provide additional expansion. The expanding gas ruptures or removes the burst disc and flows from the inflator to fill the cushion. The duration or energy of the corona may be varied to tune the gas flow provided by the inflator.

The inflator may be made by forming the housing by molding, stamping, or the like, inserting the insulative retainer, and inserting the rod in such a manner that the first end of the rod is retained within the second end of the housing by the insulative retainer. The insulative seal may be used to fix the disposition of the rod with respect to the first end of the housing. The gas may then be inserted into the housing, and the housing may be sealed to retain the gas. The inflator may be electrically coupled to the ECU, for example, by connecting electric lines from the ECU to the exposed second end of the rod and to the housing. The inflator is then ready to deploy in the event of a collision.

According to another alternative embodiment of the invention, an inflator may provide for expansion and/or release of inflation gases via combustion of metallic filaments. For example, such an inflator may have a housing and an initiation assembly contained within the housing. The inflator has a chamber that contains a gas in compressed form, in communication with the initiation assembly. The initiation assembly includes a plurality of filaments that are electrically connected to form a circuit, with the filaments in parallel with each other. The filaments may be formed of a combustible metal such as Zirconium or the like.

The circuit may be formed through the use of a junction line of the initiation assembly that couples the filaments to each other. The filaments may also be electrically coupled to the housing so that an electric potential produced between the junction line and the housing will induce current to flow through the filaments. The junction line has a plurality of resistors that separate the filaments from each other. The junction line is electrically coupled to a conductor that extends through the housing and is isolated from the housing so that an activation signal can be applied to the housing and the conductor to produce the voltage.

When a collision is detected, the ECU transmits an activation signal to the housing and to the junction line via the conductor. The resistors may have gradually increasing resistances so that current initially concentrates in the first filament of the series. The current passes from the junction line and through the first filament en route to the housing. The current heats the first filament, rapidly causing it to combust. The gas may include oxygen or some other oxidizing material that expedites the combustion. The combustion induces heat expansion of the gas, thereby opening the housing to permit the expanding gas to flow into the cushion.

The activation signal has a number of characteristics, including an amplitude or magnitude and a duration. One or more of these characteristics determine how many of the remaining filaments combust. For example, in a low speed impact, the activation signal may have a magnitude sufficient to induce combustion of only a single filament. For higher speed impacts, an activation signal with a higher magnitude may be applied so that multiple filaments combust in sequence. The result is that more expansion of the gas occurs, and the cushion is stiffer upon inflation to absorb the comparatively greater momentum.

In alternative embodiments, the filaments may be coated with pyrotechnic materials and/or disposed in tubes designed to prevent combustion from propagating directly from one filament to the next. As another alternative, the filaments may incorporate the necessary resistances, and thus separate resistors may be omitted.

Through the system and method of the present invention, an inflator may be relatively inexpensively manufactured, and may even be initiated without a pyrotechnic. The inflator may provide a continuous range of possible inflation gas quantities to enable fine tuning of cushion hardness so that the cushion can be inflated in a manner that accurately corresponds to the conditions of the collision. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 12, is not intended to limit the scope of the invention, as claimed, but is merely representative of presently preferred embodiments of the invention.

The present invention utilizes the application of variable amounts of electrical energy to control the quantity and temperature (i.e., volume) of inflation gas produced by an inflator. Deployment of the inflator may even be initiated through the direct application of electrical energy to gas, or through the use of filaments in communication with the gas. Exposure of gas or filaments to electrical energy adds volume to the gas by heat expansion, combustion, dissociation, or some combination thereof. The quantity of inflation gas produced may be relatively finely tuned by varying the duration or amplitude of the electrical signal used. The manner in which these principles are used to enhance the versatility and cost-effectiveness of inflators will be described in greater detail, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
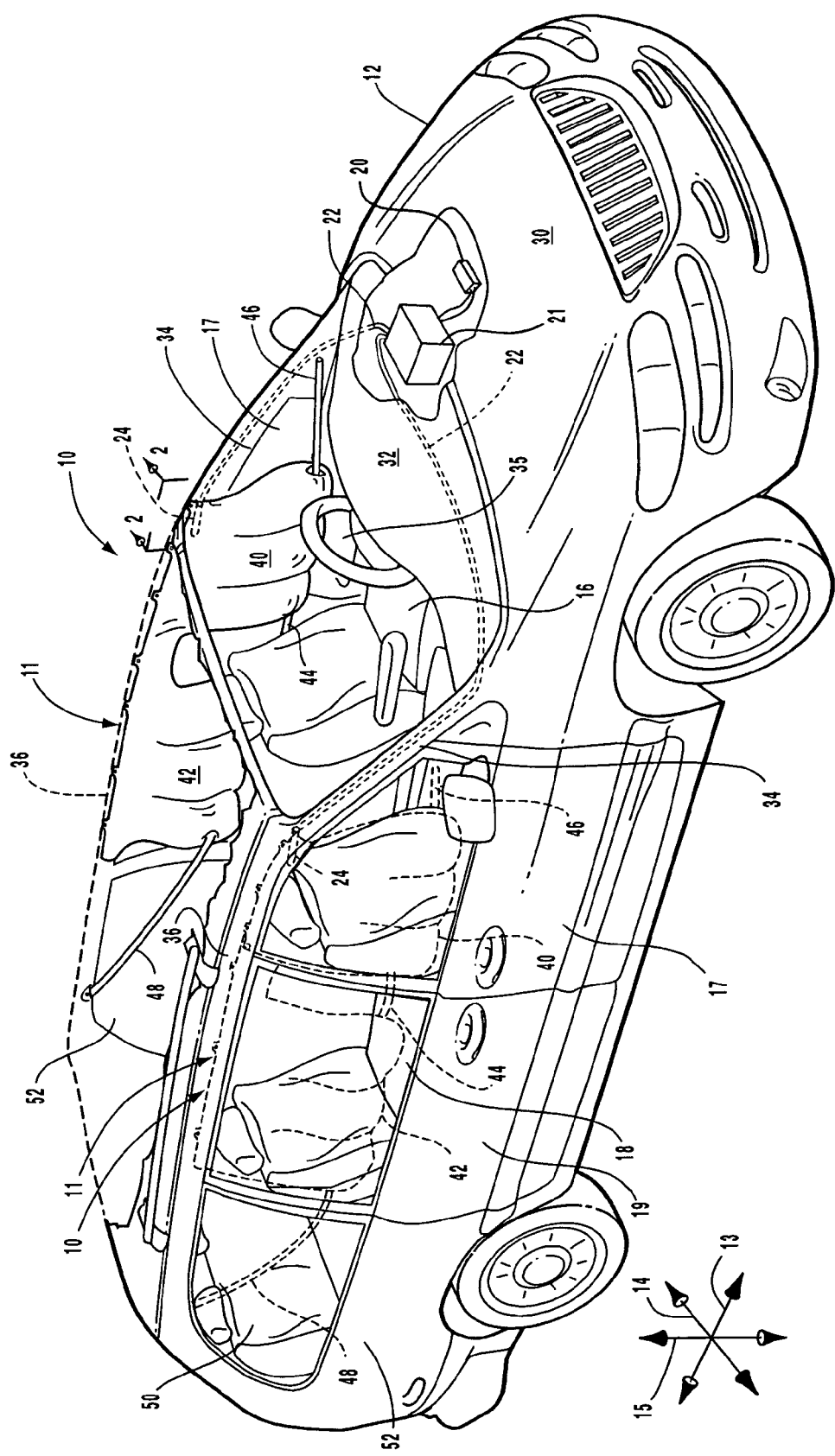
FIG. 1 is a cutaway, perspective view of a vehicle incorporating one embodiment of an airbag module according to the invention, with the airbag cushions deployed to provide occupant protection.

Referring to FIG. 1, a perspective view illustrates two inflatable curtain modules 10, or IC modules 10, according to one possible embodiment the invention. Each of the IC modules includes a cushion 11 designed to inflate to protect an occupant of a vehicle 12 in which the IC modules 10 are installed. The IC modules 10 are designed to protect the occupant from lateral impact; however, the present invention applies to other types of airbag systems such as driver's and passenger's side front impact airbags, overhead airbags, and knee bolsters. Use of side impact airbags is purely exemplary.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted.

An accelerometer 20 or other similar impact sensing devices detect sudden lateral acceleration (or deceleration) of the vehicle 12. The accelerometer 20 is coupled to an electronic control unit, or ECU 21. The ECU 21 processes output from the accelerometer 20 and transmits electric signals via electric lines 22 to inflators 24 disposed to inflate each of the cushions 11. In alternative embodiments, a single inflator 24 may be coupled to both of the cushions 11 via gas guides or other structures in such a manner that the inflator 24 inflates both of the cushions 11.

Each of the inflators 24 is designed to produce inflation gas upon application of electricity to inflate the corresponding cushion 11. The inflators 24 may operate with such rapidity that, before the vehicle 12 has fully reacted to the impact, the cushions 11 have inflated to protect vehicle occupants from impact.

The accelerometer 20 and the ECU 21 may be disposed within an engine compartment 30 or dashboard 32 of the vehicle 12. In such a configuration, the electric lines 22 may be disposed along A pillars 34 of the vehicle 12 to convey electricity from the vicinity of the dashboard 32 upward, along the windshield 35, to the inflators 24. The accelerometer 20, ECU 21, and the inflators 24 need not be positioned as shown, but may be disposed at a variety of locations within the vehicle 12. The ECU 21 may include capacitors or other devices designed to provide a sudden, reliable burst of electrical energy.

Each of the cushions 11 is installed along one of the roof rails 36. The cushions 11 shown in FIG. 1 are configured to protect not only occupants of the front seats 16, but those of the rear seats 18 as well. Thus, each cushion 11 may have a first protection zone 40 configured to inflate between the front seats 16 and one of the front doors 17, and a second protection zone 42 configured to inflate between the rear seats 18 and one of the rear doors 19.

The first and second protection zones 40, 42 of each cushion 11 may be attached together through the use of a central tether 44 between the protection zones 40, 42. The central tethers 44 may be longitudinally positioned between the front seats 16 and the rear seats 18; consequently, the central tethers 44 may or may not be configured to provide impact protection for occupants of the vehicle 12. If desired, the central tethers 44 may be replaced by broader fabric sections and/or additional inflatable chambers (not shown).

The first protection zone 40 of each cushion 11 may be attached to the adjoining A pillar 34 via a front tether 46. Similarly, the second protection zone 42 of each cushion 11 may be attached to the rearward portion of the adjoining roof rail 36 via a rear tether 48. The front and rear tethers 46, 48 cooperate with the central tether 44 to provide a tension line across each cushion 11 to keep the cushions 11 in place during inflation and impact.

Although each cushion 11 in FIG. 1 has two protection zones 40, 42, the invention encompasses the use of cushions with any number of protection zones. Thus, if desired, the protection zones 42 and central tethers 44 may be omitted to leave only the protection zones 40. Alternatively, each of the cushions 11 may be extended to have one or more protection zones positioned to protect occupants of extra seats 50 behind the rear seats 18 from impact against third lateral surfaces 52 of the vehicle 12.

The inflators 24 are designed to directly apply the electrical energy from the electric lines 22 directly to gas within the inflators 24 to induce expansion of the gas. The volume of inflation gas produced may be tuned by adjusting the amplitude and/or duration of the electric signal provided by the ECU 21 via the electric lines 22. The manner in which the inflators 24 operate will be shown and described in greater detail in connection with FIGS. 2 and 3, as follows.

Figure 2:
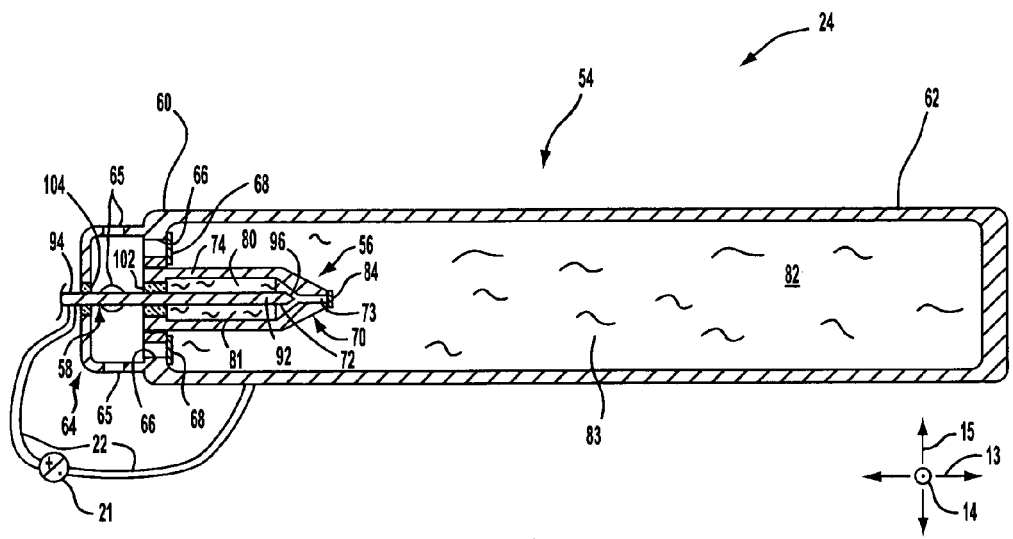
FIG. 2 is a side elevation, section view the inflator of the airbag module of FIG. 1, prior to deployment.

Referring to FIG. 2, a side elevation, section view illustrates one of the inflators 24 of FIG. 1. The ECU 21 is illustrated schematically as a voltage source coupled to the inflator 24 via the electric lines 22. The inflator 24 has a housing 54, an interior wall 56, and a conductor that takes the form of a rod 58. The interior wall 56 is disposed within the housing 54 and the rod 58 extends from within the housing 54. As illustrated, the electric lines 22 are connected to the housing 54 and to the rod 58.

The housing 54 is constructed of a high strength, electrically conductive material such as steel. The housing 54 has a generally tubular shape with an outlet end 60 from which inflation gas exits the inflator 24 and a containment end 62. The housing 54 has a diffuser 64 disposed at the outlet end 60. As shown, the diffuser 64 has a generally tubular shape with an outside diameter somewhat smaller than that of the remainder of the housing 54.

The diffuser 64 has a plurality of outlet orifices 65 arranged in radially symmetrical fashion around the circumference of the outlet end 60 so that gases exiting the diffuser 64 will have thrust vectors that substantially negate each other. Thus, the inflator 24 may be substantially unaffected by thrust from the exiting inflation gases.

The outlet end 60 also has a plurality of outlet ports 66 disposed to permit gas to flow into the diffuser 64 from the remainder of the inflator 24. The outlet ports 66 are distributed about the axis of the inflator 24 in radially symmetrical fashion. The outlet ports 66 provide a combined gas flow area that may be designed to limit the maximum rate at which inflation gas is able to leave the outlet end 60. Although only two outlet ports 66 are visible in the section view of FIG. 2, any number of outlet ports 66 may be used as long as the outlet ports 66 provide a smaller flow area than the outlet orifices 65 for the inflation gas.

The outlet ports 66 are covered by an annular foil 68 that seals the outlet ports 66, thereby keeping gas from escaping until the inflator 24 deploys. The annular foil 68 may be a thin sheet of metal, such as steel, cut to an annular shape to cover the outlet ports 66. If desired, the outlet ports 66 may include a variety of sizes so that the number of outlet ports 66 that are opened by rupture of the annular foil 68 is dependent on the magnitude of the pressure gradient. In this way, differences in environmental conditions such as the ambient temperature around the inflator 24 may be compensated for by changing the total area of the outlet ports 66 that are open to permit gas outflow. In the alternative to the annular foil 68, burst discs or the like may be used to cover the outlet ports 66, if desired.

The interior wall 56 also has a generally tubular shape with a portion that tapers to form a nozzle 70. The nozzle 70 has a generally tapered interior, which may be a conical interior surface 72. The nozzle 70 also has a constricted passageway 73 disposed at the axis of the inflator 24. The interior wall 56 also has a tubular extension 74 that extends from the housing 54 to the nozzle 70. The tubular extension 74 has a tubular shape with no significant tapering.

The interior wall 56 defines an interior chamber 80 within the housing 54. The interior chamber 80 contains a first gas 81. The first gas 81 includes a fuel and an oxidizer that are present at concentrations below the lean flammability limit of the first gas 81. Thus, the first gas 81 is combustible, but requires the continuous application of thermal energy to maintain the combustion at the pressure at which the first gas 81 is stored within the interior chamber 80. As a result, it is possible to induce combustion of only a portion of the first gas 81. The gas 81 may include a fuel such as methane or hydrogen.

According to alternative embodiments, the gas within the interior chamber 80 need not be combustible, but may rather operate without any fuel or oxidizer. The gas may simply expand in response to the application of thermal energy. Alternatively, the gas may dissociate in response to the application of thermal energy to create additional moles of gas, thereby augmenting the volume of the inflation gas. If dissociation is to be used, the gas may include nitrous oxide or some other gas that readily dissociates. Dissociation, thermal expansion, and/or combustion may be used in combination with each other.

The interior wall 56 and the housing 54 cooperate to define an exterior chamber 82 much larger than the interior chamber 80. The exterior chamber 82 contains a second gas 83, which is not combustible in the embodiment of FIG. 2. Rather, the second gas 83 may be an inert gas such as a combination of argon and helium. In alternative embodiments, a combustible gas and/or a dissociating gas such as nitrous oxide may be disposed in the exterior chamber 82 in addition to or in place of the argon/helium mixture.

The first and second chambers 80, 82 are sealed from each other via an interior burst disc 84. The interior burst disc 84 may be a steel disc resistance welded or otherwise attached to the tip of the nozzle 70 to block the constricted passageway 73. The first and second gases 81, 83 are both stored in compressed form, i.e., at a pressure above the ambient pressure outside the inflator 24. The first gas 81 may optionally be at a pressure higher than that of the second gas 83.

According to an alternative embodiment, only a single gas may be disposed within the inflator. The inflator may store the gas in two separate chambers, or in one single chamber in which a nozzle is disposed. The chamber may simply be arranged in such a manner that most of the pressurized gas must pass through an electric arc and a nozzle to exit the inflator. Thus, the use of two different types of gas or two separate chambers within an inflator is optional.

The rod 58 has a first end 92 disposed within the interior chamber 80 and a second end 94 positioned outside the housing 54 to contact the associated electric line 22. As shown, the first end 92 has a conical surface 96 disposed inside the nozzle 70 such that the conical surface 96 is separated from the conical interior surface 72 of the nozzle 70 by a comparatively narrow space. The rod 58 is formed of an electrically conductive, high temperature resistant material such as steel or a tungsten/thorium alloy. In alternative embodiments, a rod may be disposed on the outflow side of the nozzle, or may even pass through the nozzle.

The rod 58 is kept electrically isolated from the remainder of the inflator 54 by insulative seals 102, 104. The insulative seal 102 has an annular shape designed to seal around the rod 58, and is disposed within the end of the tubular extension 74 of the interior wall 56 to seal the interior chamber 80 from the space within the diffuser 64 while permitting passage of the rod 58 into the interior chamber 80. The insulative seal 104 also has an annular shape that seals around the rod 58. The insulative seal 104 prevents gas from exiting the diffuser 64 from proximate the rod 58.

The insulative seals 102, 104 are formed of a high strength material capable of attaching to metal to form a gas-tight seal. For example, the insulative seals 102, 104 may be made of a phenolic, rubber, or glass. In one embodiment, the insulative seals 102, 104 are made of glass attached through the use of a sealing technology such as Glass to Metal to form a seal between the insulative seals 102, 104 and the rod 58 and the diffuser 64 or the tubular extension 74, respectively. The manner in which the inflator 24 deploys in response to a collision will be described in connection with FIG. 3.

Figure 3:
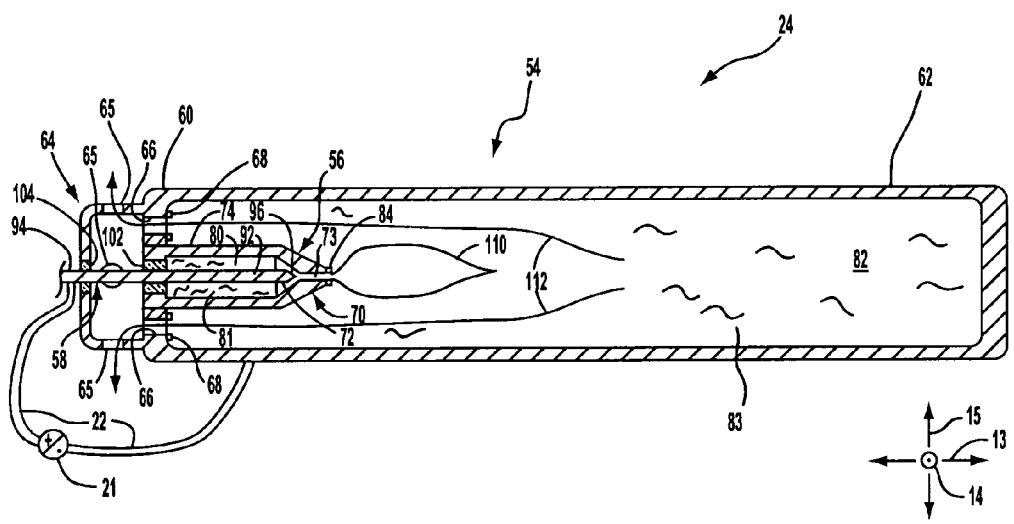
FIG. 3 is a side elevation, section view of the inflator of the airbag module of FIG. 1, illustrating an arc-jet created within the inflator during deployment.

Referring to FIG. 3, a side elevation, section view illustrates the inflator 24 during deployment. The ECU 21 receives signals from the accelerometer 20 that indicate that a collision has occurred. The ECU 21 in turn, transmits an activation signal in the form of an electric voltage to the inflator 24 via the electric lines 22. The voltage is conveyed to the housing 54 and the rod 58 by the electric lines 22. Since the housing 54 is in communication with the interior wall 56, the voltage exists between the nozzle 70 and the first end 92 of the rod 58.

The nozzle 70 may thus act in conjunction with the housing 54 to form an anode while the rod 58 acts as the cathode for the electric circuit. Since the rod 58 is coaxial with the nozzle 70, an annular gap exists between the anode and the cathode.

The voltage is created across at least a portion of the first gas 81 within the annular gap between the anode and the cathode. In this application, creation of a voltage "across" a gas refers to the existence of an electrical potential that results in the passage of an electric current directly through the gas, as opposed to passage of electric current through a solid conductor disposed within the gas.

As mentioned previously, the conical surface 96 of the first end 92 is separated from the conical interior surface 72 of the nozzle 70 by only a comparatively small gap. The gap is small enough that, in response to the voltage, current arcs from the conical surface 96 to the nozzle 70. The first gas 81 proximate the arc (not shown) is resistance heated by the arc as it ionizes. The proximate portion of the first gas 81 then ignites in response to the heat. Consequently, the pressure differential between the interior chamber 80 and the exterior chamber 82 increases. Since the fuel/oxidizer mix within the first gas 81 is below the lean flammability limit of the first gas 81, combustion does not immediately propagate throughout the first gas 81.

When the pressure differential between the chambers 80, 82 reaches a threshold, the interior burst disc 84 is removed or ruptured by the pressure differential. The combusting first gas 81 is then able to exit the interior chamber 80 via the constricted passageway 73 to enter the exterior chamber 82. However, in order to reach the constricted passageway 73, the first gas 81 is constrained to pass adjacent to the arc. Thus, the first gas 81 ignites as it passes through the constricted passageway 73 to form an arc-jet plume 110, as shown. The arc applies enough heat to turn the proximate portion of the first gas 81 into a plasma, which aids in formation of the arc-jet plume 110.

The arc-jet plume 110 projects into the exterior chamber 82 to heat the portion of the second gas 82 that surrounds the nozzle 70. The second gas 82 thermally expands, and possibly dissociates, in response to the heat from the arc-jet plume 110. The result is an increase in the pressure gradient between the exterior chamber 82 and the space within the diffuser 64. When this pressure gradient reaches a threshold, the annular foil 68 is ruptured or removed from the outlet ports 66 to permit the first and second gases 81, 83 to exit the exterior chamber 82.

As the resulting gas outflows 112 approach the outlet ports 66, the majority of the gas passes adjacent to the arc-jet plume 110, thereby undergoing further expansion. The expanding inflation gases move through the outlet ports 66, into the diffuser 64, and into the cushion 11 via the outlet orifices 65.

The voltage provided by the ECU 21 is a sustained voltage. In this application, a "sustained voltage" is an electric voltage that is applied for a period of time longer than that required to trigger release of gas from the inflator. A sustained voltage may have periods during which the amplitude of the voltage is zero, as is the case with a pulsed voltage. In this application, "pulsing" refers to the application of multiple cycles. A sustained voltage is differentiated from a voltage spike in that the sustained voltage is able to induce further expansion of the gases within the inflator after initiation. In the inflator 24 of FIG. 3, the voltage may be applied continuously until substantially all of the first and second gases 81, 83 have left the inflator 24.

Alternatively, the voltage may be provided for a somewhat shorter duration to provide a smaller volume of inflation gas, thereby inflating the cushion 11 in a softer manner. As another alternative, the amplitude of the voltage may be adjusted to control the heat and size of the arc-jet plume 110, thereby controlling the volume of inflation gas produced. If desired, the voltage may also be pulsed or otherwise varied over time to obtain the desired characteristics of the arc-jet plume 110.

Consequently, the operation of the inflator 24 may be relatively easily adjusted to suit the conditions of the collision in which the vehicle 12 is involved. In this application, "severity of a collision" refers to the amount of kinetic energy to be dissipated by an airbag cushion, and thus incorporates factors including the rate of deceleration of the vehicle and the weight of the occupant to be protected by the airbag module.

In the alternative to the configuration of FIGS. 1–3, the voltage need not be routed through the housing 54, or even through the nozzle 70. Rather, if desired, two separate conductors may be disposed within a nozzle in such a manner that an electric arc forms between them. Gas entering the nozzle may be directed to flow through or proximate the arc without passage of current through the nozzle. Thus, the terms "anode" and "cathode," as used in this application, need not include the housing or nozzle of an inflator. Rather, "anode" and "cathode" simply refer to conductors of any shape that carry opposite charges. Thus, an elongated cathode such as the rod 58 is also not required.

The inflator 24 may be comparatively easily manufactured. According to one method, the main portion of the housing 54 and the interior wall 56 may be made separately by methods such as casting, stamping, or the like. The rod 58 may be extruded or otherwise shaped in the desired fashion. The diffuser 64 may also be cast, stamped, or formed through a similar process. The outlet ports 66 and the outlet orifices 65 may be formed through punching, piercing, or a similar operation.

The rod 58 may then be attached to the insulative seal 102 and the interior seal 102 may be disposed within the tubular extension 74 to position the first end 92 of the rod 58 proximate the nozzle 70. The interior seal 102 may be fixed in place within the interior wall 56 via Glass to Metal techniques, as mentioned previously. The first gas 81 may be injected into the interior chamber 80 through the constricted passageway 73 or through a fill port (not shown), and the interior burst disc 84 is then attached to the nozzle 70 to retain the first gas 81.

The interior wall 56 may be installed in the outlet end 60 of the housing 54 prior to attachment of the diffuser 64. The tubular extension 74 may be welded, brazed, or otherwise attached to the outlet end 60. According to alternative methods, the interior wall 56 may be installed within the housing 54 prior to filling of the interior chamber 80 with the first gas 81 and sealing of the interior chamber 80 with the interior burst disc 84. When the interior wall 56 is in place, the annular foil 68 is disposed over the outlet ports 66 to seal them. The second gas 83 may be inserted into the exterior chamber 82 through a fill port (not shown), which is subsequently sealed to retain the second gas 83.

The insulative seal 104 may be attached to the remainder of the diffuser 64 via Glass to Metal methods or by some other technique, and the diffuser 64 may be inserted such that the second end 94 of the rod 58 extends through the insulative seal 104. The diffuser 64 is then attached to the remainder of the housing to enclose the outlet ports 66 via welding, brazing, or other methods. Inertial or resistance welding, for example, may be used to attach the diffuser 64 to the remainder of the housing 54. The insulative seal 104 is also attached to the rod 58. If desired, attachment of the diffuser 64 and the insulative seal 104 may be performed prior to insertion of the second gas 83 within the exterior chamber 82.

The inflator 24 is then ready for installation in the vehicle 12. Hence, the electric lines 22 may be attached to the housing 54 and the second end 94 of the rod 58 by soldering, adhesive bonding, or some other attachment mechanism. The outlet end 60 of the housing 54 may be disposed within the associated cushion 11 and the cushion 11 may be clamped or otherwise closed around the housing 54 to keep inflation gas from escaping through the space between the inflator 24 and the cushion 11. The inflator 24 is then securely attached to a part of the interior of the vehicle 12, such as the roof rail 36 to which the cushion 11 is attached. The housing 54 may be coupled to the vehicle 12 and to the cushion 11 in such a manner that the inflator 24 is electrically isolated, aside from connection of the inflator 24 to the ECU 21, to avoid short-circuiting the signal path through the housing 54. Other inflators according to the invention may be similarly installed in an electrically isolated manner.

The inflator 24 need not necessarily be used in an inflatable curtain module, but may be used to inflate a wide variety of cushion types. FIGS. 1 through 3 represent only one of many possible embodiments of an inflator according to the present invention. Other potential embodiments that employ an arc-jet to effect gas expansion will be shown and described in connection with FIGS. 4 and 5, as follows.

Figure 4:
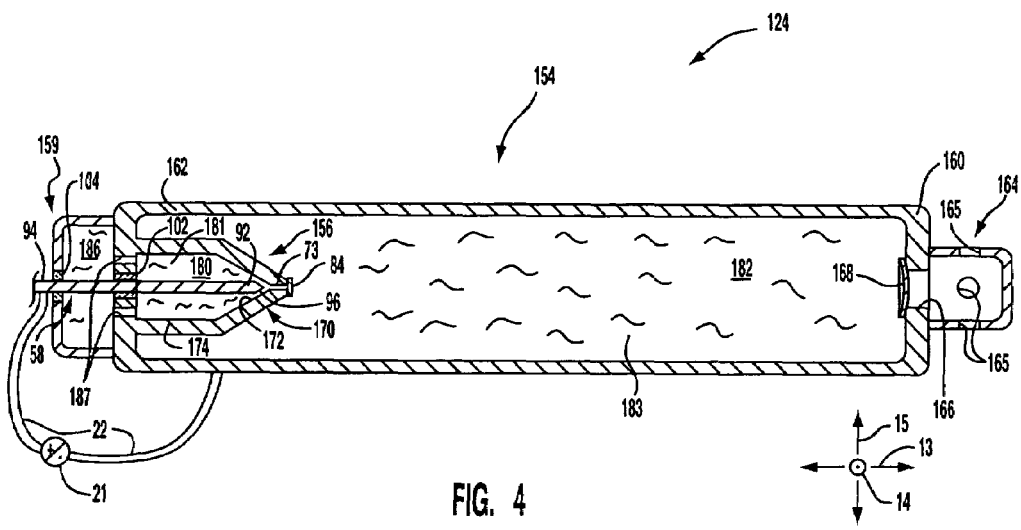
FIG. 4 is a side elevation, section view of an inflator designed to produce an arc-jet according to an alternative embodiment of the invention.

Referring to FIG. 4, a side elevation, section view illustrates an inflator 124 according to one alternative embodiment of the invention. The inflator 124 may be used to inflate a cushion of an inflatable curtain module, like the cushion 11 of FIG. 1. Alternatively, the inflator 124 may be used in conjunction with a wide variety of airbag types.

As shown, the inflator 124 has a housing 154, an interior wall 156, a conductor in the form of a rod 58, and a supplemental wall 159. The housing 154 and the interior wall 156 are integrally formed with each other. The housing 154 has an outlet end 160 and a containment end 162. Unlike the inflator 24 of FIGS. 1–3, the interior wall 156 is disposed at the containment end 162, rather than at the outlet end 160.

The housing 154 also includes a diffuser 164 disposed at the outlet end 160. The diffuser 164 has a generally tubular shape with an outside diameter smaller than that of the remainder of the housing 154, which also has a generally tubular shape. The diffuser 164 has a plurality of outlet orifices 165 arrayed around its circumference in radially symmetrical fashion to provide substantially thrust neutral deployment.

An outlet port 166 permits gas to flow from the remainder of the housing 154 into the diffuser 164. During normal vehicle operation, the outlet port 166 is covered by a burst disc 168. The outlet port 166 provides a flow area sufficiently smaller than the combined flow areas of the outlet orifices 165 so that the outlet port 166 controls the rate at which gas is able to exit the inflator 124.

The interior wall 156 is shaped to define a nozzle 170 at one end. The nozzle 170 has a conical interior surface 172 and a constricted passageway 73 similar to that of the previous embodiment. The interior wall 156 may also have a tubular extension 174 by which the interior wall 156 connects to the housing 154 in integral fashion.

The interior wall 156 defines an interior chamber 180 within the housing 154. The interior chamber 180 contains a first gas 181, which, like the first gas 81 of the previous embodiment, may include a fuel/oxidizer mix. The interior wall 156 cooperates with the housing 154 to define an exterior chamber 182 containing a second gas 183. Like the second gas 83 of the previous embodiment, the second gas 183 need not contain a fuel or oxidizer, but may simply expand by dissociation and/or simple thermal expansion. The first and second chambers 180, 182 are separated from each other by an interior burst disc 84 attached to the nozzle 170 to cover the constricted passageway 73. The first gas 181 may be stored at a pressure higher than that of the second gas 183.

The supplemental wall 159 cooperates with the containment end 162 of the housing 154 to define a supplemental chamber 186 adjacent to the interior chamber 180. The supplemental chamber 186 is in communication with the interior chamber 180 via a plurality of orifices 187 formed in the containment end 162 between the interior chamber 180 and the supplemental chamber 186. Thus, the first gas 181 may also be disposed within the supplemental chamber 186 and may flow relatively freely between the interior chamber 180 and the supplemental chamber 186. If desired, the orifices 187 may be sized to restrict gas flow from the supplemental chamber 186 to the interior chamber 180.

As with the previous embodiment, the rod 58 has a first end 92 disposed adjacent to the nozzle 170 and a second end 94 disposed outside the inflator 124. The first end 92 has a conical surface 96 positioned such that a comparatively small gap remains between the conical surface 96 and the conical interior surface 172 of the nozzle 170.

The rod 58 is electrically isolated from the housing 154 via insulative seals 102 and 104, each of which has an annular shape that encircles the rod 58. The insulative seal 102 is disposed within the junction of the interior wall 156 with the housing 154. The insulative seal 104 is seated within the supplemental wall 159. The ECU 21 is coupled to the second end 94 of the rod 58 and to the housing 154 via the electric lines 22.

In operation, the inflator 124 also uses an arc-jet to bring about gas expansion. More specifically, the nozzle 170 is in electrical communication with the housing 154 in such a manner that the nozzle 170 can act as an anode while the rod 58 acts as a cathode. Creation of a voltage between the electric lines 22 results in the production of a voltage within an annular gap between the nozzle 170 and the rod 58. An arc forms between the conical surface 96 of the first end 92 of the rod 58 and the nozzle 170.

As with the previous embodiment, a portion of the first gas 181 combusts proximate the arc to increase the pressure within the interior chamber 180, thereby rupturing or removing the interior burst disc 84. The first gas 181 moves through the constricted passageway 73 to exit the interior chamber 180. An arc-jet (not shown) is formed by combustion of the emerging first gas 181.

The arc-jet plume extends into the exterior chamber 182 to induce expansion of the second gas 183. The resulting pressure increase within the exterior chamber 182 ruptures or removes the burst disc 168 to unblock the outlet port 166. Thus, the expanding first and second gases 181, 183 are able to enter the diffuser 164 via the outlet port 166 and thence, to exit the diffuser 164 via the outlet orifices 165. The majority of the second gas 183 is not necessarily forced to flow past the arc-jet plume to reach the outlet port 166. However, significant gas expansion may still be provided by the arc-jet plume.

As mentioned previously, the orifices 187 between the supplemental chamber 186 and the interior chamber 180 may be constricted to limit the rate at which the first gas 181 is able to reach the nozzle 170 from the supplemental chamber 186. The orifices 187 may additionally or alternatively be blocked by burst discs (not shown) or other structures designed to open only when a threshold pressure gradient between the supplemental and interior chambers 186, 180 has been reached. Thus, the intensity of the arc-jet, and therefore the timing and output of the inflator 124, may be pre-tuned to adapt the inflator 124 to factors that are not collision-specific, such as the type of cushion used.

The inflator 124 may also be manufactured according to a variety of different methods. According to one method, the housing 154 and the interior wall 156 are integrally formed by casting, stamping, or similar operations. The supplemental wall 159 is separately formed by a similar operation. The rod 58 is formed in the manner described above, in connection with the previous embodiment.

The rod 58 and the insulative seal 102 may be attached together and inserted into the open end of the interior wall 156 until the first end 92 of the rod 58 is properly positioned with respect to the nozzle 170. The insulative seal 102 is then attached to the interior wall 156. The interior burst disc 84 may be attached to the nozzle 170.

The first gas 181 may be inserted into the interior chamber 180 in a comparatively simple manner. More specifically, the insulative seal 104 may be installed in the supplemental wall 159 and fixed in place. The first gas 181 may then be inserted into the space within the supplemental wall 159 in cryogenic form. The supplemental wall 159 is then aligned with the second end 94 of the rod 58 and moved to abut the containment end 162 of the housing 154. The rod 58 extends through the insulative seal 104 and the edge of the supplemental wall 159 is attached to the containment end 162 of the housing 154. The cryogenic material is then able to sublimate within the supplemental chamber 186 to provide the first gas 181 within the supplemental chamber 186 and the interior chamber 180. The first gas 181 may alternatively be inserted in gaseous or liquid form, if desired.

Figure 5:
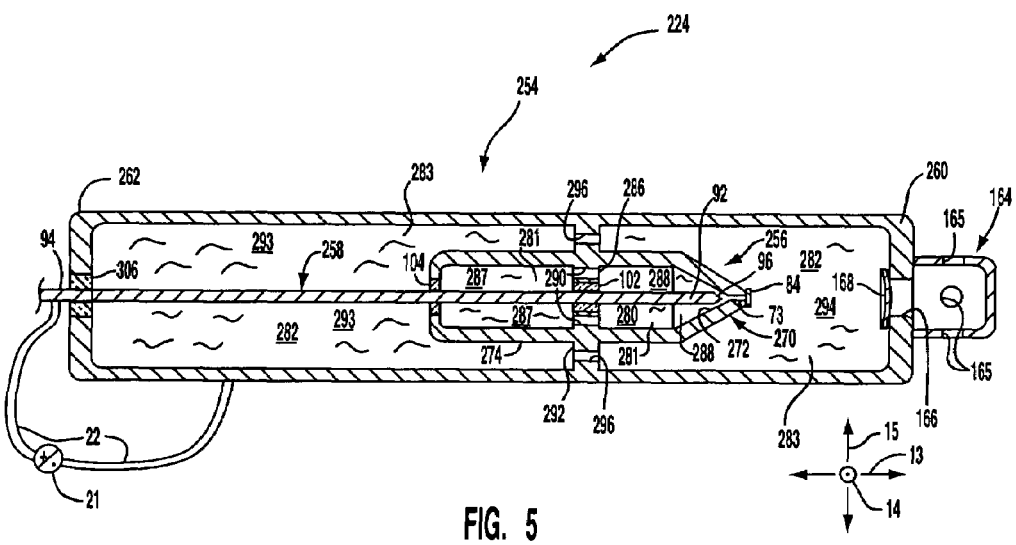
FIG. 5 is side elevation, section view of an inflator designed to produce an arc-jet according to another alternative embodiment of the invention.

Referring to FIG. 5, a side elevation, section view illustrates an inflator 224 according to another alternative embodiment of the invention. The inflator 224 may be used to inflate a cushion of an inflatable curtain module, like the cushion 11 of FIG. 1. Alternatively, like the inflators 24, 124 described previously, the inflator 224 may be used in conjunction with a wide variety of airbag types.

As shown, the inflator 224 has a housing 254, an interior wall 256, and a conductor in the form of a rod 258. The housing 254 and the interior wall 256 are integrally formed with each other. The housing 254 has an outlet end 260 and a containment end 262. In contrast to the inflators 24, 124 of FIGS. 1–4, the interior wall 256 is centrally located within the inflator 224, generally between the containment end 262 and the outlet end 260.

Like the housing 154 of the inflator 124, the housing 254 also includes a diffuser 164 disposed at the outlet end 260. The diffuser 164 has a generally tubular shape with an outside diameter smaller than that of the remainder of the housing 254, which also has a generally tubular shape. The diffuser 164 has a plurality of outlet orifices 165 arrayed around its circumference in radially symmetrical fashion to provide substantially thrust neutral deployment.

An outlet port 166 permits gas to flow from the remainder of the housing 254 into the diffuser 164. During normal vehicle operation, the outlet port 166 is covered by a burst disc 168. The outlet port 166 provides a flow area sufficiently smaller than the combined flow areas of the outlet orifices 165 so that the outlet port 166 controls the rate at which gas is able to exit the inflator 224.

The interior wall 256 is shaped to define a nozzle 270 disposed toward the outlet end 260. The nozzle 270 has a conical interior surface 272 and a constricted passageway 73 similar to that of the previous embodiments. The interior wall 256 may also have a tubular extension 274 disposed toward the containment end 262 of the housing 254. The interior wall 256 connects with the housing 254 in integral fashion generally between the nozzle 270 and the tubular extension 274.

The interior wall 256 defines an interior chamber 280 within the housing 254. The interior chamber 280 contains a first gas 281, which, like the first gas 81 and the first gas 181 of the previous embodiments, may include a fuel/oxidizer mix. The interior wall 256 cooperates with the housing 254 to define an exterior chamber 282 containing a second gas 283. Like the second gas 83 and the second gas 183 of the previous embodiments, the second gas 283 need not contain a fuel or oxidizer, but may simply expand by dissociation and/or simple thermal expansion. The first and second chambers 280, 282 are separated from each other by an interior burst disc 84 attached to the nozzle 270 to cover the constricted passageway 73. The first gas 281 may be stored at a pressure higher than that of the second gas 283.

As shown, the interior wall 256 has an interior chamber divider 286. The interior chamber divider 286 is generally annular in shape and separates the interior chamber 280 into a distal portion 287 generally within the tubular extension 274 and a nozzle portion 288 generally within the nozzle 270. The distal portion 287 communicates with the nozzle portion 288 via a plurality of orifices 290 formed in the interior chamber divider 286. The orifices 290 may be distributed around the axis of the inflator 224 in radially symmetrical fashion.

The orifices 290 may be large enough to provide a negligible restriction on movement of the first gas 281 from the distal portion 287 to the nozzle portion 288 during deployment of the inflator 224. In the alternative, the orifices 290 may be somewhat constricted to restrict the rate at which the first gas 281 passes from the distal portion 287 to the nozzle portion 288 to pace the delivery of thermal energy to the second gas 283.

If desired, the orifices 290 may even be covered by burst discs (not shown) or other blockages that are neutralized during deployment when the pressure differential between the distal and nozzle portions 287, 288 reaches a certain threshold. The desirability of such modifications depends upon the rate at which inflation gas is to be provided. This rate depends on the type of cushion with which the inflator 224 is used.

The housing 254 is connected to the interior wall 256 via an exterior chamber divider 292, which may have a generally annular shape coplanar with the interior chamber divider 286. The exterior chamber divider 292 separates the exterior chamber 282 into a distal portion 293 proximate the containment end 262 and an outlet portion 294 proximate the outlet end 260. The distal portion 293 communicates with the outlet portion 294 via a plurality of orifices 296 distributed around the axis of the inflator 224 in radially symmetrical fashion like the orifices 290 of the interior chamber divider 286.

The orifices 296 formed in the exterior chamber divider 292 may be sized to avoid restricting gas flow from the distal portion 293 to the outlet portion 294. Alternatively, the orifices 296 may provide flow restrictions to limit the rate at which the second gas 282 is able to exit the inflator 224.

Burst discs (not shown) or other blockages may be used to cover the orifices 296 until the outlet portion 294 empties to provide a threshold pressure differential between the distal portion 293 and the outlet portion 294. In such a case, two different gases may even be stored in the distal and outlet portions 293, 294. For example, gases with different densities may be used to provide different gas expansion characteristics. In another example, one portion, such as the outlet portion 293, may contain an inert gas while the distal portion 294 contains a gas designed to dissociate.

The rod 258 extends through the containment end 262, the interior wall 256, and the interior chamber divider 286 such that a first end 92 of the rod 258 is disposed proximate the nozzle 270. A second end 94 of the rod 258 is disposed outside the containment end 262. The first end 92 has a conical surface 96 separated from the conical interior surface 272 of the nozzle 270 by a comparatively narrow gap.

The rod 258 is kept electrically insulated from the interior chamber divider 286 via an insulative seal 102. Similarly, the rod 258 is electrically insulated from the interior wall 256 via an insulative seal 104. The rod 258 is electrically insulated from the containment end 262 of the housing 254 via an insulative seal 306. As in previous embodiments, the insulative seals 102, 104, 306 may be constructed of electrically nonconductive materials such as glass, and may be attached through the use of techniques such as Glass to Metal. The electric lines 22 are attached to the housing 254 and to the second end 94 of the rod 258 in such a manner that the nozzle acts as an anode and the rod 258 acts as a cathode to maintain an electric voltage within an annular gap between the first end 92 of the rod 258 and the nozzle 270.

In operation, the inflator 224 produces an arc-jet in a manner similar to that of the inflators 24, 124 of the previous embodiments. More specifically, the ECU 21 detects a collision and transmits a voltage to the inflator 224 via the electric lines 22. The voltage produces an electric arc between the conical surface 96 of the rod 258 and the conical interior surface 272 of the nozzle 270. The arc induces heating and combustion of a portion of the first gas 281 within the interior chamber 280. The resulting pressure increase in the interior chamber 280 ruptures or removes the interior bust disc 84 to permit the first gas 281 to exit the interior chamber 280 as it combusts, thereby forming an arc-jet (not shown) that projects into the exterior chamber 282.

The arc-jet heats the second gas 283 within the outlet portion 294 of the exterior chamber 282. When the pressure within the exterior chamber 282 reaches a threshold, the burst disc 168 is removed or ruptured to permit the first and second gases 281, 283 to exit the inflator 224 through the diffuser 164. Since the arc-jet projects near the outlet port 166, the second gas 283 must generally pass by the arc-jet to receive heat from the arc-jet. The second gas 283 expands via simple thermal expansion and/or dissociation to increase the volume of inflation gas provided by the inflator 224. As with the previous embodiments, the amplitude and/or duration of the voltage or current may be adjusted to tune the output of the inflator 224 according to the severity of the collision.

The rate at which inflation gas is produced by the inflator 224 may be pre-established by sizing and/or removably blocking the orifices 290, 296 in the interior and exterior chamber dividers 286, 292, respectively, in the manner described above. Thus, the rate at which the second gas 283 reaches the arc-jet may be modified, the intensity of the arc-jet may be modified, or both may be altered to tune the output of the inflator 224 to factors that are not collision-specific, such as the type of cushion used.

The inflator 224 may be manufactured in a number of ways. According to one example, the housing 254, the interior wall 256, the interior chamber divider 286, and the exterior chamber divider 292 may be integrally formed with each other by casting, stamping, or the like. In alternative embodiments, separate pieces may be made and assembled to provide a shape similar to that of the housing 254, the interior wall 256, the interior chamber divider 286, and the exterior chamber divider 292.

A number of processes may be used to obtain the integrally formed shape illustrated in FIG. 5. For example, the basic shape may be cast or stamped, and features such as the nozzle 270, the terminal ends of the housing 254 and the interior wall 256, and the orifices 290, 296 may be formed via separate operations such as stamping, rolling, piercing, and/or punching.

Prior to complete formation of the outlet end 260 and/or the containment end 262 of the housing 254, the rod 258 and the insulative seals 102, 104 may be installed in a manner similar to those described previously, in connection with either of the previous two embodiments. The first gas 281 may also be inserted into the interior chamber 280, and the interior burst disc 84 may be affixed to the nozzle 270 to separate the interior and exterior chambers 280, 282 from each other. The first gas 281 may be inserted through the constricted passageway 73 of the nozzle 270, or may be inserted through a fill port (not shown) formed in the interior wall 256 and sealed via welding or some other technique.

Formation of the containment end 262 may be completed and the insulative seal 306 may be positioned and fixed in place with respect to the containment end 262. Formation of the outlet end 260 may also be completed and the burst disc 168 may be disposed inside the outlet port 166 to block the outlet port 166, as illustrated. The diffuser 164 may be attached to the remainder of the housing 254 by, for example, inertial welding.

The second gas 283 maybe inserted into the exterior chamber 282 via a fill port (not shown) formed in the housing 254. The fill port may subsequently be closed by welding or a similar process. The inflator 224 may then be connected to the electric lines 22, coupled to a cushion, and installed in a vehicle. Those of skill in the art will recognize that many other manufacturing processes may be used to form the inflator 224 illustrated in FIG. 5.

The embodiments illustrated in FIGS. 1–5 add direct electrical energy to a gas through the formation of an arc-jet. However, use of an arc-jet is only one example of a method of controlling inflator output through the direct application of electricity to gas. Other methods may alternatively be used within the scope of the invention to energize inflation gas to enable the output of an inflator to be tailored to the severity of a collision. One such alternative method is the creation of an electric corona. The use of an electric corona to energize inflation gas will be shown and described in connection with FIGS. 6 and 7, as follows.

Figure 6:
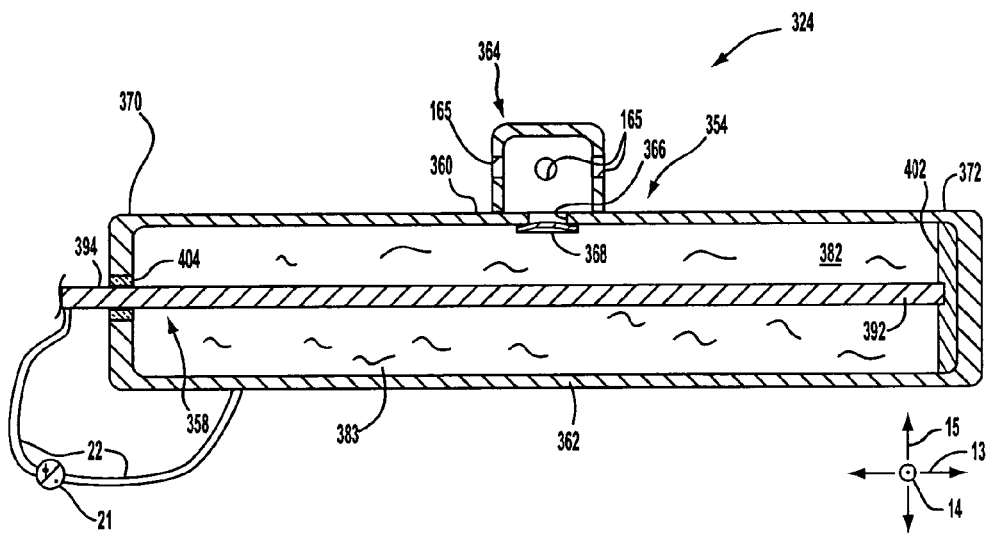
FIG. 6 is a side elevation, section view of an inflator according to another alternative embodiment of the invention.

Referring to FIG. 6, a side elevation, section view illustrates an inflator 324 according to another alternative embodiment of the invention. The inflator 324 may be used to inflate a cushion such as a cushion for a passenger's side frontal impact airbag (not shown). Alternatively, like the inflators 24, 124, 224 described previously, the inflator 324 may be used in conjunction with a wide variety of airbag types.

As shown, the inflator 324 has a housing 354 and a conductor in the form of a rod 358. The housing 354 has an outlet end 360 and a containment end 362. As shown, the housing 354 has a generally tubular shape, but the outlet end 360 and the containment end 362 are not displaced from each other along the axis of the tube, as with previous embodiments. Rather, the outlet end 360 is one side of the curved wall of the housing 354, and the containment end 362 is the opposite side of the curved wall. Use of the term "outlet end" in this application does not necessarily refer to a position on the axis of symmetry of an inflator housing.

The housing may be constructed of a high strength, electrically conductive material such as steel. The housing 354 has a diffuser 364 disposed at the outlet end 360. The diffuser 364 has a generally tubular shape similar to that of the diffusers 164 of the previous two embodiments, except that the diffuser 364 is shaped to be attached to the curved wall of the remainder of the housing 354. The diffuser 364 has an outside diameter smaller than that of the remainder of the housing 354. The diffuser 364 has a plurality of outlet orifices 165 arrayed around its circumference in radially symmetrical fashion to provide substantially thrust neutral deployment.

An outlet port 366 permits gas to flow from the remainder of the housing 354 into the diffuser 364. During normal vehicle operation, the outlet port 366 is covered by a burst disc 368. The outlet port 366 provides a flow area sufficiently smaller than the combined flow areas of the outlet orifices 165 so that the outlet port 166 controls the rate at which gas is able to exit the inflator 324.

The housing 354 also has a first end 370 and a second end 372, which are disposed along the axis of symmetry of the tubular shape of the housing 354. The housing 354 defines a chamber 382 in which a gas 383 is disposed in compressed form. Like the second gas 83, the second gas 183, and the second gas 283, the gas 383 may be an inert gas designed to expand through simple thermal expansion and/or dissociation. In alternative embodiments, a gas with a fuel/oxidizer mixture below the lean flammability limit of the gas may be used.

The rod 358 has a first end 392 disposed within the second end 372 of the housing 354 and a second end 394 disposed outside the first end 370 of the housing 354. Like the rods 58, 258 of the previous embodiments, the rod 358 is constructed of a conductive material such as steel, a tungsten alloy, or the like. The first end 392 is held in place by an insulative retainer 402, and the rod 358 passes through an insulative seal 404 disposed in the first end 370 of the housing 354. The insulative retainer 402 and the insulative seal 404 are constructed of an electrically nonconductive material such as glass. The insulative retainer 402 and the insulative seal 404 may each be attached to the rod 358 and to the housing 354 via a method such as Glass to Metal. The insulative seal 404 forms a seal between the rod 358 and the first end 370 of the housing 354.

As with the previous embodiments, the ECU 21 is electrically coupled to the inflator 324 via the electric lines 22. The electric lines 22 are coupled to the housing 354 and to the second end 394 of the rod 358. An airbag cushion (not shown) may be disposed to envelop the diffuser 364 or the entire inflator 324, or may be coupled to the diffuser 364 via a gas guide or the like (not shown).

Figure 7:
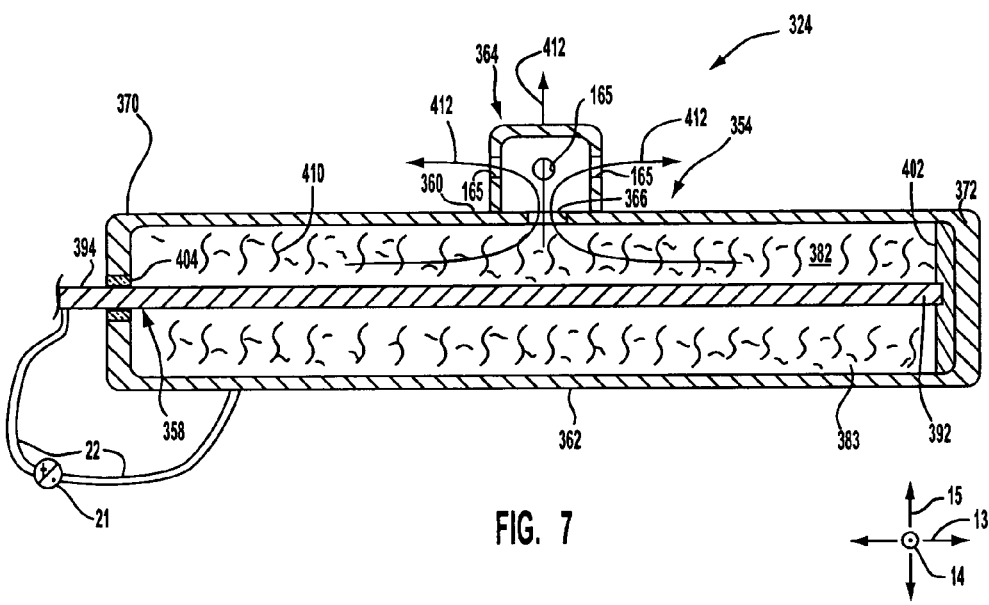
FIG. 7 is a side elevation, section view of the inflator of FIG. 6, illustrating an electric corona created within the inflator during deployment.

Referring to FIG. 7, a side elevation, section view illustrates the inflator 324 during deployment. The ECU 21 receives signals from the accelerometer 20 that indicate that a collision has occurred. The ECU 21 in turn, transmits an activation signal in the form of an electric voltage to the inflator 324 via the electric lines 22. The voltage is conveyed to the housing 354 and the rod 358 by the electric lines 22. The housing 354 may thus act as the anode, while the rod 358 acts as the cathode for the electric circuit to provide a voltage across an annular gap between the housing 354 and the rod 358.

The voltage may be pulsed at a comparatively high frequency. According to one example, the voltage may be pulsed repeatedly, with a period of only a few nanoseconds. The pulsing may be an alternating current (A/C) type pulsing with a sinusoidal waveform. Alternatively, the pulsing may involve changing the amplitude of the voltage between zero and some maximum value. The result of the pulsing may be to bring the gas 383 to a transient plasma state in which the gas 383 conducts enough current to absorb energy and possibly ionize, but not enough to form an arc. The result is the formation of an electric corona, or corona 410, which is an electric discharge distributed over a volume of gas.

The corona 410 induces thermal expansion and/or dissociation of the gas 383, over a large portion of the volume of the chamber 382. The corresponding pressure increase within the chamber 382 ruptures or removes the burst disc 368 from the outlet port 366 to permit gas outflows 412 to exit the inflator 324 through the outlet port 366 and the outlet orifices 165. The gas outflows 412 enter and inflate the cushion.

The volume of inflation gas produced may be tuned by variation of the amplitude, frequency, and/or duration of the voltage or current applied to the inflator 324. For a more severe collision, for example, the corona 410 may be intensified, while a less intense corona provides sufficient gas expansion for a low speed impact.

In the alternative to the configuration illustrated in FIGS. 6 and 7, a corona need not be formed in conjunction with the inflator housing. Rather, two separate conductors may be disposed within an inflator housing in such a manner that the corona forms between them. Thus, electric current need not pass through an inflator housing to form a corona.

As another alternative, deployment of an inflator according to the invention need not be initiated via the arc-jet. Rather, an inflator may have a pyrotechnic initiator or the like. The pyrotechnic initiator may be used to open a burst disc and/or an interior burst disc. Electric energy, in the form of an arc-jet, corona, or the like, may simultaneously or subsequently be applied to the gas in varying degrees to control the expansion of the gas according to the severity of the collision or other factors.

According to other alternatives, an inflator without compressed gas, such as a pyrotechnic inflator, may utilize direct application of electrical energy to gas to control expansion of the gas. For example, combustion products exiting the inflator may be directed through an arc-jet or corona to add additional volume to the gas, to a degree dependent upon the severity of the collision or other factors.

The inflator 324 may be manufactured according to a number of methods. In one example, the overall tubular form of the housing 354 is first manufactured, for example, by stamping or casting. The burst disc 368 is disposed to cover the outlet port 366. The insulative retainer 402 is inserted into the second end 372 of the housing, and the rod 358 is inserted through the first end 370 such that the first end 392 of the rod 358 seats in the insulative retainer 402. The insulative seal 404 is attached to the rod 358 and to the first end 370 of the housing 354 to form a seal.

The diffuser 364 is then attached to the remainder of the housing 354, over the outlet port 366. A welding method or the like may be used. The gas 383 may be inserted into the chamber 382 via a fill port (not shown) formed in the housing 354. The fill port may subsequently be sealed via welding or a similar operation. The inflator 324 may then be coupled to the electric lines 22 and the cushion, and installed in the vehicle.

The inflators of FIGS. 1–7 apply electrical energy directly to gas to provide variable inflation levels. In alternative embodiments, electrical energy may be routed through a combustible, resistive members such as filaments disposed within the gas. One such embodiment will be shown and described in connection with FIG. 8-10, as follows.

Figure 8:
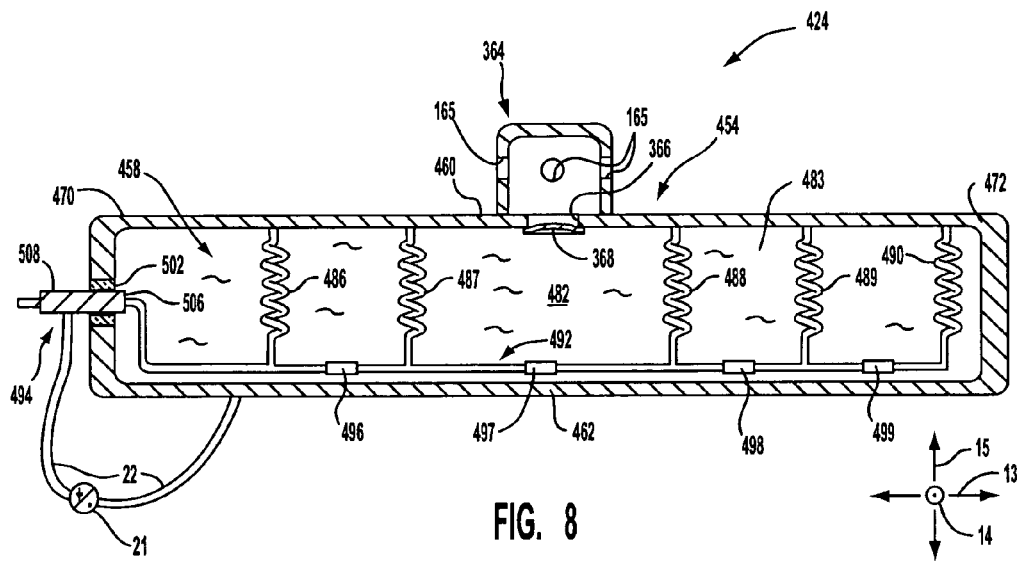
FIG. 8 is a side elevation, section view of an inflator according to yet another alternative embodiment of the invention.

Referring to FIG. 8, a side elevation, section view illustrates an inflator 424 according to yet another alternative embodiment of the invention. Rather than exciting a gas through application of electrical energy to the gas, the inflator 424 utilizes combustible filaments to induce gas expansion.

As shown, the inflator 424 has a housing 454 and an initiation assembly 458 disposed within the housing 454 to induce expansion of a compressed gas. The housing 454 has an outlet end 460 and a containment end 462. A diffuser 364 like that of the previous embodiment is disposed at the outlet end 460 of the housing 454. The diffuser 364 has a plurality of outlet orifices 165 disposed in a radial arrangement to provide substantially thrust-neutral deployment. An outlet port 366 provides communication between the interior of the diffuser 364 and the remainder of the housing 454. The outlet port 366 is sealed via a burst disc 368 during normal vehicle operation.

As shown, the inflator 424 is of a type similar to that of the inflator 324, with the diffuser 364 attached to the curved wall of the housing 454. Thus, the inflator 424 may be used to inflate a passenger's side, frontal impact airbag cushion or the like. In the alternative, as with the preceding embodiments, the operating principles of this embodiment may be applied to any type of inflator including inflators for inflatable curtains, knee bolsters, driver's side frontal impact airbags, or overhead airbags.

The housing 454 has a generally tubular shape with a first end 470 and a second end 472. The housing 454 defines a chamber 482 that contains a gas 483 in compressed form. In one example, at least a portion of the gas 483 is oxygen. The gas 483 may be a mix of oxygen with an inert gas, dissociating gas, or combustible fuel. The use of oxygen may not be necessary if solid oxidizing agents are used in conjunction with the initiation assembly 458.

The initiation assembly 458 includes a first filament 486, a second filament 487, a third filament 488, a fourth filament 489, and a fifth filament 490. Each of the filaments 486, 487, 488, 489, 490 may be a wire constructed of a combustible metal such as zirconium, magnesium, or the like. The filaments 486, 487, 488, 489, 490 may extend along any suitable path within the chamber 483, and are illustrated with a generally radial orientation simply by way of example. The filaments 486, 487, 488, 489, 490 need not be parallel to each other. The filaments 486, 487, 488, 489, 490 may also follow straight pathways, meandering pathways, or geometric pathways such as the helical pathways illustrated in FIG. 8.

The filaments 486, 487, 488, 489, 490 are electrically coupled together in parallel. More precisely, the filaments 486, 487, 488, 489, 490 are coupled to a junction line 492 disposed within the housing 454. Additionally, the filaments 486, 487, 488, 489, 490 are disposed in electrical communication with the housing 454 so that the housing 454 cooperates with the initiation assembly 458 to form an electric circuit incorporating all of the filaments 486, 487, 488, 489, 490. The junction line 492 is coupled to a conductor 494 that extends through the housing 454.

As illustrated, the junction line 492 has a first resistor 496, a second resistor 497, a third resistor 498, and a fourth resistor 499. The first resistor 496 is disposed generally between the first filament 486 and the second filament 487. The second resistor 497 is disposed generally between the second filament 487 and the third filament 488. The third resistor 498 is disposed generally between the third filament

488 and the fourth filament 489. The fourth resistor 499 is disposed generally between the fourth filament 489 and the fifth filament 490. If desired, an additional resistor (not shown) may be disposed generally between the conductor 494 and the first filament 486.

The resistors 496, 497, 498, 499 may be conventional electrical resistors. If desired, they, and possibly the remainder of the junction line 492, may optionally be shielded from the heat and pressure within the inflator 424. Alternatively, the resistors 496, 497, 498, 499 may be constructed of materials specially designed to tolerate high pressures and temperatures.

The resistors 496, 497, 498, 499 operate to concentrate current flow through only one of the resistors 496, 497, 498, 499 at a time. Thus, the first resistor 496 may have a resistance much higher than that of the first filament 486, the second resistor 497 may have a resistance much higher than that of the second filament 487, and so on.

If desired, the resistors 496, 497, 498, 499 may present progressively stepped up resistances to ensure that current flows through the filaments 486, 487, 488, 489, 490 consecutively. The resistors 496, 497, 498, 499 may increase in resistance by orders of magnitude. For example, the first resistor 496 may be one Ohm, the second resistor 497 may be ten Ohms, the third resistor 498 may be one hundred Ohms, and the fourth resistor 499 may be one kilo-Ohm. Alternatively, the resistors 496, 497, 498, 499 may have equal resistances or resistances that differ according to a different formula.

The conductor 494 may be electrically isolated from the first end 470 of the housing 454 via an insulative seal 502, which may be formed of an insulator such as glass or another ceramic. As with previous embodiments, known techniques such as Glass to Metal may be used to attach the outer edges of the insulative seal 502 to the housing 454. The insulative seal 502 forms a gas-tight seal between the first end 470 of the housing 454 and the conductor 494.

The conductor 494 has a first end 506 disposed within the chamber 483 and coupled to the junction line 492, and a second end 508 disposed outside the housing 454. The ECU 21 is coupled to the second end 508 of the conductor 494 and to the housing 454 via the electric lines 22.

Figure 9:
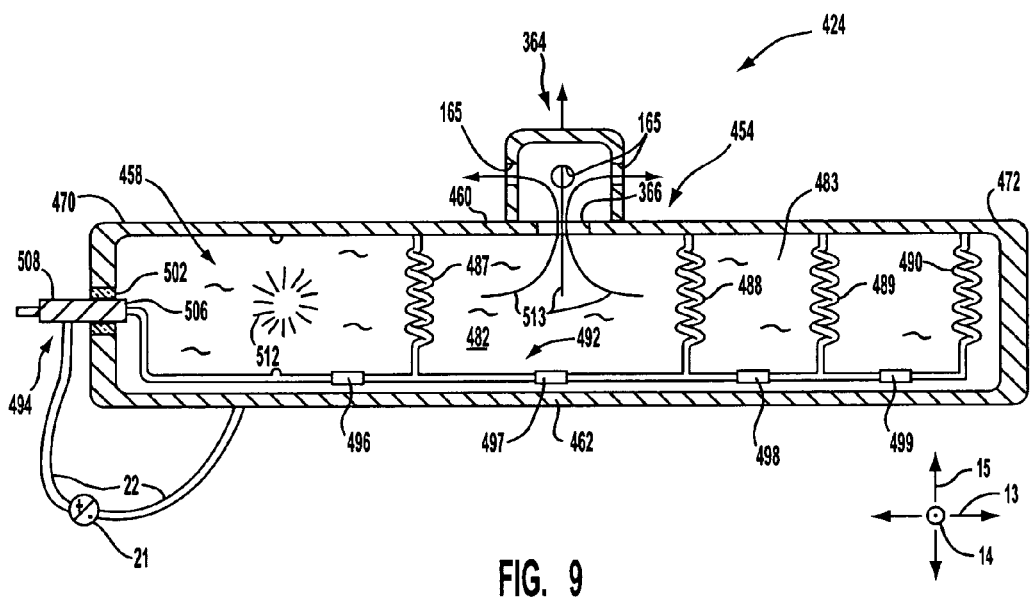
FIG. 9 is a side elevation, section view of the inflator of FIG. 8, illustrating combustion of one filament for initial deployment or low-speed impact.

Referring to FIG. 9, a side elevation, section view illustrates the inflator 424 in an initial phase of deployment. In response to detection of a collision, the ECU 21 transmits an activation signal through the electric lines 22 in the form of a voltage between the housing 454 and the conductor 494. Most of the resulting current moves through the first filament 486 because the resistance of the first resistor 496 makes current flow through the first filament 486 easier than through a path that includes any of the other filaments 487, 488, 489, 490.

In response to the current, the first filament 486 combusts to exude combustion heat 512. The combustion heat 512 heats the gas 483, which increases in pressure. If desired, the first filament 486 may provide a sufficient quantity of combustion heat 512 to remove or rupture the burst disc 368. Gas outflows 513 of the gas 483 then exit the chamber 482 through the outlet port 366, enter the diffuser 364, and then exit the diffuser 364 via the outlet orifices 165.

The activation signal has one or more characteristics, including amplitude, duration, waveform (i.e., D/C, A/C, pulsed, etc.). The ECU 21 selects at least one of the characteristics from a plurality of options to determine the quantity of energy added to the gas 483.

For example, if the collision occurs at a comparatively low velocity and/or the occupant to be protected is comparatively light, no further heat may be required. Thus, the activation signal may cease to be applied, or the activation signal may simply lack the voltage to move enough current through the first resistor 496 to cause combustion of any of the remaining filaments 487, 488, 489, 490. The filaments 487, 488, 489, 490 remain intact and the gas 483 exits the housing 454 without receiving further heat. As a result, a somewhat limited amount of energy is applied to the gas 483 to provide a comparatively soft cushion.

If the collision occurs at a comparatively higher velocity and/or the occupant to be protected is comparatively heavier, it may be desirable to induce combustion of one or more of the remaining filaments 487, 488, 489, 490. This is the situation illustrated in FIG. 10.

Figure 10:
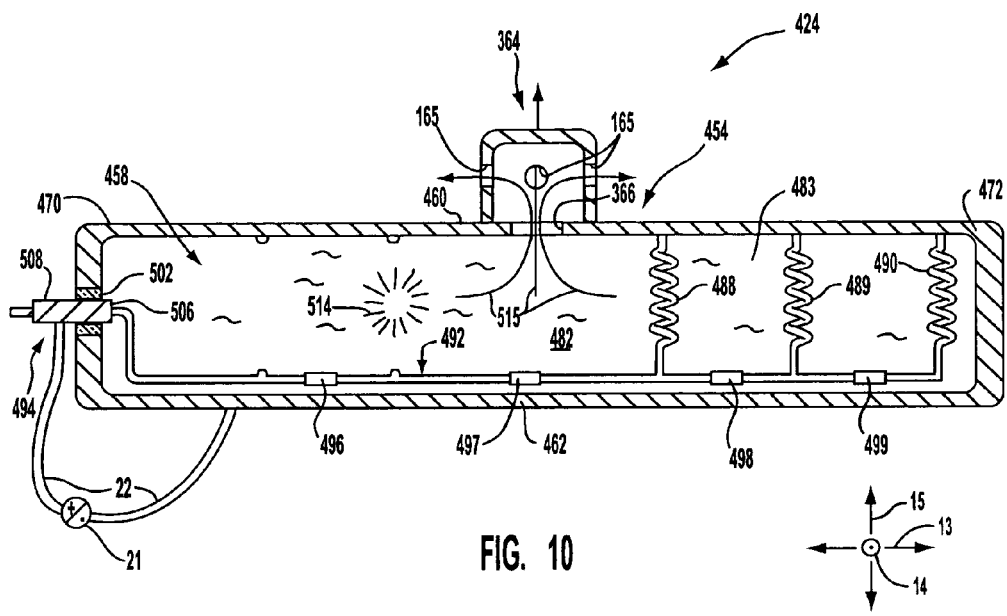
FIG. 10 is a side elevation, section view of the inflator of FIG. 8, illustrating combustion of a second filament during subsequent deployment or a higher speed impact.

Referring to FIG. 10, a side elevation, section view illustrates the inflator 424 of FIGS. 8 and 9 during a second stage of deployment. After combustion of the first filament 486, electric current is no longer able to move from the junction line 492 to the housing 454 via the first filament 486. Due to the need for additional cushion stiffness, the ECU 21 selects the characteristics of the activation signal such that additional heat is provided to the gas 483.

More precisely, the activation signal induces combustion of the second filament 487 despite the presence of the first resistor 496. Combustion heat 514 is provided by combustion of the second filament 487. The second filament 487 combusts before substantially all of the gas 483 has exited the chamber 482. Thus, the combustion heat 514 further elevates the temperature of the gas 483, thereby causing it to expand further. Consequently, augmented gas outflows 515 exit the inflator 424. The additional expansion provides for a somewhat stiffer cushion.

If desired, the characteristics of the activation signal may be selected such that sufficient current does not flow through the first and second resistors 496, 497 to induce combustion of any of the remaining filaments 488, 489, 490. Alternatively, the activation signal may have an amplitude, duration, or other characteristic selected such that one or more of the remaining filaments 488, 489, 490 combusts. With five filaments 486, 487, 488, 489, 490, as illustrated in FIG. 8, five discrete inflation levels are provided. More or fewer filaments could be used to provide the desired number of inflation levels.

The filaments 486, 487, 488, 489, 490 need not be identical. Rather, they may be designed to combust at different current levels and to provide different quantities of heat. For example, the first filament 486 may be designed to combust at a comparatively high current level to avoid accidental deployment, and to provide a comparatively high quantity of heat to remove the burst disc 368. The remaining filaments 487, 488, 489, 490 may provide more incremental quantities of energy, and may require less current due to the presence of the resistors 496, 497, 498, 499.

Furthermore, the housing 454 need not be part of the circuit in which the initiation assembly 458 is incorporated. Rather, if desired, a second junction line (not shown) may be disposed on the opposite side of the filaments 486, 487, 488, 489, 490 from the junction line 492. The second junction line may be connected to a second conductor that also passes through the housing such that the conductors are not in direct electrical communication with each other or with the housing. The electric lines 22 may then be coupled to both conductors, rather than to the conductor 494 and the housing 454.

In other alternative embodiments, the filaments 486, 487, 488, 489, 490 may be combined with pyrotechnics and/or insulated from each other to enhance inflator operation.

Examples of such embodiments will be shown and described with reference to FIGS. 11 and 12.

Figure 11:
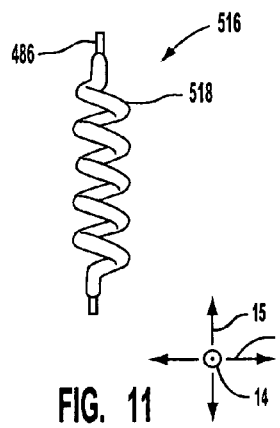
FIG. 11 is a side elevation, enlarged view of a filament according to another embodiment of the invention, with a pyrotechnic coating to enhance heat production.

Referring to FIG. 11, a side elevation, section view illustrates a filament assembly 516 according to an alternative embodiment of the invention. The filament assembly 516 may be used in place of any of the filaments 486, 487, 488, 489, 490 in the inflator 424 of FIGS. 8–10 to provide additional heat to the gas 483.

More specifically, the filament assembly 516 has a first filament 486 like that of FIGS. 8–10. The first filament 486 is coated with a pyrotechnic coating 518 that combusts along with the first filament 486 to enhance the amount of heat added to the gas 483. The pyrotechnic coating 518 may include a solid fuel and oxidizer mixture of any type known in the art. The pyrotechnic coating 518 may cover all of the first filament 486, or may only cover selected portions of the first filament 486.

Figure 12:
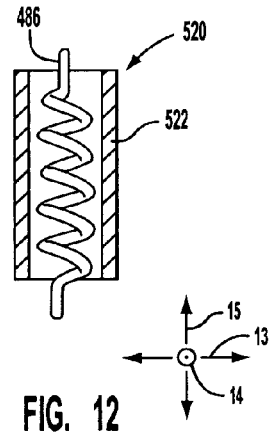
FIG. 12 is a side elevation, enlarged view of a filament according to another embodiment of the invention, with an isolating tube disposed to restrict expulsion of combustion products from the filament.

Referring to FIG. 12, a side elevation, section view illustrates a filament assembly 520 according to another embodiment of the invention. The filament assembly 520 may be used in place of any of the filaments 486, 487, 488, 489, 490 in the inflator 424 of FIGS. 8–10 to help avoid direct propagation of combustion between filaments.

More precisely, the filament assembly 520 may include a first filament 486 like that of FIGS. 8–10. The filament assembly 520 may also have an isolating tube 522 that encircles the main portion of the first filament 486. The isolating tube 522 may be constructed of phenolic or some other material designed to contain ejected combusting projectiles, hot particulate matter, and the like. The isolating tube 522 helps to prevent such heated material from initiating combustion of any of the remaining filament assemblies 520.

Through the use of the present invention, inflators may be more simply and inexpensively manufactured due to a reduction in the number of pyrotechnic elements and other parts. Furthermore, an inflator according to the invention may provide a quantity of inflation gas that can be comparatively finely tuned to adapt the inflation of the cushion to a range of collision, vehicle, and passenger characteristics.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator for inflating a cushion of an airbag module for protecting an occupant of a vehicle from impact, the inflator comprising:
   a quantity of compressed gas;
   an anode; and
   a cathode;
   wherein one of the anode and the cathode extends through at least a portion of the other of the anode and the cathode such that the anode and the cathode cooperate to produce a voltage across at least a portion of the compressed gas to induce expansion of the compressed gas in response to application of an activation signal to the anode and cathode.

2. The inflator of claim 1, wherein the anode and the cathode are disposed to produce the voltage to release the compressed gas from containment within a housing of the inflator.

3. The inflator of claim 2, wherein the anode and cathode are disposed to continue producing the voltage after release of the compressed gas from containment.

4. The inflator of claim 1, wherein the anode and the cathode are coupled to a voltage source that varies the voltage according to severity of a collision in which the vehicle is involved.

5. The inflator of claim 1, wherein the compressed gas comprises a gas selected to dissociate when acted upon by the voltage, the dissociation inducing expansion of the compressed gas.

6. The inflator of claim 5, wherein the compressed gas comprises nitrous oxide.

7. The inflator of claim 1, wherein the compressed gas is of a type selected to combust when acted upon by the voltage, the compression inducing expansion of the compressed gas.

8. The inflator of claim 7, wherein the compressed gas comprises a fuel/oxidizer mix with a concentration selected such that the compressed gas remains under a lean flammable limit of the compressed gas to limit combustion of the compressed gas.

9. The inflator of claim 1, wherein the anode and the cathode are disposed such that the voltage produces an arc across the compressed gas, wherein one of the anode and the cathode comprises a nozzle that directs the portion of the compressed gas through the arc to form an arc-jet.

10. The inflator of claim 1, wherein the anode and the cathode are disposed such that the voltage produces a corona within the compressed gas.

11. An inflator for inflating a cushion of an airbag module for protecting an occupant of a vehicle from impact, the inflator comprising:
    a housing;
    a quantity of compressed gas stored within the housing;
    a nozzle in communication with the compressed gas, the nozzle having a generally tapered interior; and
    at least one conductor disposed to produce an electrical arc proximate the nozzle such that at least a portion of the compressed gas passes through the nozzle and is heated by the electrical arc to form an arc-jet in response to receipt of an electric activation signal by the conductor.

12. The inflator of claim 11, wherein the conductor comprises one of an anode and a cathode and the nozzle comprises the other of the anode and the cathode, wherein the conductor comprises a rod disposed proximate the nozzle such that a voltage between the rod and the nozzle produces the electrical arc between the nozzle and the rod.

13. The inflator of claim 11, wherein the nozzle is integrated with an interior wall disposed to define an interior chamber within the housing, the interior wall cooperating with the housing to define an exterior chamber.

14. The inflator of claim 13, further comprising a burst disc disposed to seal the interior chamber from the exterior chamber until the inflator deploys.

15. The inflator of claim 14, wherein the compressed gas comprises a first gas and a second gas different from the first gas, wherein the first gas is disposed within the interior chamber and the second gases is disposed within the exterior chamber.

16. The inflator of claim 13, wherein the housing comprises an outlet end in which at least one outlet orifice is formed, wherein the nozzle is formed proximate the outlet end such that a majority of the compressed gas flows past the nozzle to reach the outlet orifice.

17. The inflator of claim 13, further comprising a supplemental wall attached to the housing to define a supplemental chamber between the housing and the supplemental wall, wherein the supplemental chamber is in communication with the interior chamber.

18. The inflator of claim 13, wherein the exterior chamber comprises an exterior chamber divider disposed to separate the exterior chamber into an outlet portion and a distal portion, wherein the interior chamber is disposed generally between the outlet portion and the distal portion.

19. An airbag module for protecting an occupant of a vehicle from impact, the airbag module comprising:
 a cushion having a stowed configuration and a deployed configuration in which the cushion is inflated to receive impact of the occupant; and
 an inflator comprising an anode and a cathode, wherein one of the anode and the cathode extends through at least a portion of the other of the anode and the cathode such that the anode and the cathode cooperate to produce a voltage across at least a portion of a gas to induce expansion of the gas in response to application of an activation signal to the anode and cathode.

20. The airbag module of claim 19, wherein the anode and the cathode are disposed to produce the voltage to release the gas from containment within a housing of the inflator.

21. The airbag module of claim 20, wherein the anode and cathode are disposed to continue producing the voltage after release of the gas from containment.

22. The airbag module of claim 19, wherein the anode and the cathode are coupled to a voltage source that varies the voltage according to severity of a collision in which the vehicle is involved.

23. The airbag module of claim 19, wherein the gas comprises a gas selected to dissociate when acted upon by the voltage, the dissociation creating additional gas and inducing expansion of the gas.

24. The airbag module of claim 19, wherein the gas is of a type selected to combust when acted upon by the voltage, the combustion inducing expansion of the gas.

25. The airbag module of claim 19, wherein the anode and the cathode are disposed such that the voltage produces an arc across the gas, wherein one of the anode and the cathode comprises a nozzle that directs the portion of the gas through the arc to form an arc-jet.

26. The airbag module of claim 19, wherein the anode and the cathode are disposed such that the voltage produces a corona within the gas.

* * * * *